(12) United States Patent
Li

(10) Patent No.: US 9,964,797 B2
(45) Date of Patent: May 8, 2018

(54) MANUFACTURING METHOD FOR COLOR FILM SUBSTRATE AND LCD APPARATUS

(71) Applicant: Shenzhen China Star Optoelectronics Technology Co., Ltd., Shenzhen (CN)

(72) Inventor: Ji Li, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 158 days.

(21) Appl. No.: 14/908,121

(22) PCT Filed: Dec. 29, 2015

(86) PCT No.: PCT/CN2015/099620
§ 371 (c)(1),
(2) Date: Jan. 28, 2016

(87) PCT Pub. No.: WO2017/092131
PCT Pub. Date: Jun. 8, 2017

(65) Prior Publication Data
US 2017/0255054 A1     Sep. 7, 2017

(30) Foreign Application Priority Data
Dec. 4, 2015 (CN) .......................... 2015 1 0890328

(51) Int. Cl.
*G02F 1/1335* (2006.01)
*G02F 1/1337* (2006.01)
(Continued)

(52) U.S. Cl.
CPC ...... *G02F 1/133514* (2013.01); *G02F 1/1337* (2013.01); *G02F 1/1368* (2013.01);
(Continued)

(58) Field of Classification Search
CPC ......... G02F 1/133514; G02F 1/133516; G02F 1/133528; G02F 1/133512; G02F 1/1337;
(Continued)

(56) References Cited

U.S. PATENT DOCUMENTS 9,213,197 B2 * 12/2015 Wang ................ G02F 1/133514
9,740,038 B2 * 8/2017 Im ..................... G02F 1/133514
(Continued)

FOREIGN PATENT DOCUMENTS

| CN | 103698832 A | 4/2014 |
| CN | 104460103 A | 3/2015 |

*Primary Examiner* — Hoan C Nguyen
(74) *Attorney, Agent, or Firm* — Leong C. Lei

(57) ABSTRACT

The invention provides a manufacturing method for color film substrate and LCD apparatus. The method utilizes the quantum dot (QD) material to form a color film layer having a red, green, cyan and blue filter layer on the bottom substrate to realize four-color display scheme, improve QD utilization and improve display color domain; the LCD apparatus comprises a color film layer and a blue backlight module, the color film layer comprises red, green, cyan and blue filter layer, the red filter layer comprises a red filter film and a red QD film on the red filter film; the green filter layer comprises a green filter film and a green QD film on the green filter film; the cyan filter layer comprises a green QD film; by using QD material to mix blue backlight and color film layer to realize four-color scheme, improve QD utilization and improve display color domain.

5 Claims, 6 Drawing Sheets

(51) Int. Cl.
*G02F 1/1368* (2006.01)
*G02F 1/1362* (2006.01)

(52) U.S. Cl.
CPC .. *G02F 1/133512* (2013.01); *G02F 1/133516* (2013.01); *G02F 1/133528* (2013.01); *G02F 1/133621* (2013.01); *G02F 1/136209* (2013.01); *G02F 2001/133614* (2013.01); *G02F 2201/121* (2013.01); *G02F 2201/123* (2013.01); *G02F 2202/36* (2013.01)

(58) Field of Classification Search
CPC ............ G02F 1/1368; G02F 1/136209; G02F 1/133621; G02F 2201/123; G02F 2201/121; G02F 2202/36; G02F 2001/133614
USPC ......................................................... 349/106
See application file for complete search history.

(56) References Cited

U.S. PATENT DOCUMENTS

| | | | |
|---|---|---|---|
| 9,804,489 B2* | 10/2017 | Liang | G03F 7/0007 |
| 2009/0102352 A1* | 4/2009 | Cok | H01L 51/5265 |
| | | | 313/498 |
| 2011/0069369 A1* | 3/2011 | Park | G02B 26/002 |
| | | | 359/230 |
| 2016/0018575 A1* | 1/2016 | Chen | G02F 1/133514 |
| | | | 359/887 |
| 2017/0255056 A1* | 9/2017 | Liu | G02F 1/133514 |

* cited by examiner

MANUFACTURING METHOD FOR COLOR FILM SUBSTRATE AND LCD APPARATUS

BACKGROUND OF THE INVENTION

1. Field of the Invention

The present invention relates to the field of display, and in particular to a manufacturing method for color film substrate and an LCD apparatus.

2. The Related Arts

As the display technology progresses, the demands on the display quality also grow. The known liquid crystal (LC) TV can express the color domain between 68%-72% NTSC (National Television Standards Committee), and therefore is insufficient to provide high quality color effects. To improve expressive color domain of LC TV, a high color spectrum backlight technology is the focus of the industry.

The quantum dots (QD) refers to the semiconductor die with diameter between 1-100 nm. Because QD has a small diameter less than or closer to the exciton Bohr radius of corresponding material to generate quantum confinement effect. The continuous band gap structure of the material will transform into discrete energy level structure. Under the excitation of the external light source, the electron transits and emits fluorescent.

The use of QD material provides the advantages of concentrated light-emitting spectrum, high color purity, the ability to control light color by QD material size, structure or composition adjustment. When applied to display apparatus, the QD material can effectively improve the color domain and color restoration capability. AT present, the most common approach is to use blue light-emitting diode (LED) as backlight source. The blue backlight, after passing red QD film, green QD film, displays red and green, and passing through a transparent layer, displays blue; that is, the three basic colors (red, green, and blue) mixed to display. Although the QD material can improve display effect of the display panel, but still remains within the scope of three-color display technology. However, the three-color display is unable to completely display all the natural colors.

To expand the color domain displayed by the display panel, a new basic color different from red (R), green (G) and blue(B) is added to the three-color scheme to become a four-color scheme. The added color is cyan (C), wherein the cyan can be obtained by mixing the green light and blue light. However, in the known four-color specifications, the four colors are provided by filter film made of corresponding dye, and the light utilization is low and the color effect is far from ideal. In the display field, the QD material applied to the four-color display technology is yet mature.

SUMMARY OF THE INVENTION

The object of the present invention is to provide a manufacturing method for color film substrate, by using the QD material to form color film layer of red, green, blue and cyan filter layer on the bottom substrate so as to realize the four-color display of display apparatus and improve QD utilization and effectively increase the display color domain.

Another object of the present invention is to provide an LCD apparatus, which comprises a backlight module and a color film layer, by using the QD material to combine the blue backlight and the color film layer to form four-color display of display apparatus and improve QD utilization and effectively increase the display color domain.

To achieve the above object, the present invention provides a manufacturing method for color film substrate, which comprises: Step 1: providing a bottom substrate, forming a black matrix on the bottom substrate, the black matrix arranged to form a plurality of red sub-pixel areas, a plurality of green sub-pixel areas, a plurality of cyan sub-pixel areas, and a plurality of blue sub-pixel areas; Step 2: forming red color filter films and green color films in the red sub-pixel areas and green sub-pixel areas respectively; Step 3: forming red quantum dot films in the red sub-pixel areas on the bottom substrate, green quantum dot films in the green sub-pixel areas on the bottom substrate, and green quantum dot films in the cyan sub-pixel areas on the bottom substrate; after Steps 2-3, a color film layer being obtained on the bottom substrate, the color film layer comprising a plurality of red, green, cyan, and blue filter layers corresponding to the plurality of red, green, cyan, and blue sub-pixel areas; the red filter layer comprising the red filter film and the red quantum dot film on the red filter film; the green filter layer comprising the green filter film and the green quantum dot film on the green filter film; the cyan filter layer comprising the green quantum dot film; and the blue filter layer comprising no material or a transparent film.

In Step 1, the black matrix formed on the bottom substrate has a thickness of 1-3 um.

In Step 2, the red filter films and green filter films are formed by a lithography or sputter printing process; and in Step 3, the red quantum dot film and the green quantum dot film are formed by a lithography or sputter printing process.

In Step 2 or Step 3, transparent layers are formed in the blue sub-pixel areas on the bottom substrate; the blue filter layer comprises the transparent layers in the blue sub-pixel areas.

The red quantum dot film emits a red light with a 620-640 nm peak and a half wave width of 30-40 nm when excited by light; the green quantum dot film emits a green light with a 520-540 nm peak and a half wave width of 30-40 nm when excited by light; the transmittance of the red filter film is above 95.8% for light having wavelength within 620-780 nm, and below 0.2% for light having wavelength within 430-570 nm; the transmittance of the green filter film is above 90% for light having wavelength within 486-560 nm, and below 50% for light having wavelength within 640-730 nm.

The present invention also provides an LCD apparatus, which comprises an LCD panel, and a backlight module disposed below the LCD panel; the LCD panel comprising an upper substrate and a lower substrate, disposed correspondingly with each other; a liquid crystal layer, disposed between the upper substrate and the lower substrate; an upper polarizer, disposed above the upper substrate; and a lower polarizer, disposed below the lower substrate; the upper substrate comprising a first bottom substrate, a black matrix and a color film layer, disposed on the side of the first bottom substrate closer to the liquid crystal layer, a common electrode layer, disposed on the black matrix and the color film layer, and a first alignment film, disposed on the common electrode layer; wherein the black matrix forming a plurality of red sub-pixel areas, a plurality of green sub-pixel areas, a plurality of cyan sub-pixel areas, and a plurality of blue sub-pixel areas on the bottom substrate, the color film layer comprising a plurality of red, green, cyan, and blue filter layer corresponding to the plurality of red, green, cyan, and blue sub-pixel areas; the red filter layer comprising the red filter film and a red quantum dot film on the red filter film; the green filter layer comprising the green filter film and a green quantum dot film on the green filter film; the cyan filter layer comprising a green quantum dot film; and the blue filter layer comprising no material or a transparent film; the backlight module emitting blue light; the red quantum dot film emitting red light under excitation of blue light, and the green quantum dot film emitting green light under excitation of blue light; when the LCD apparatus displaying colors, the blue backlight passing the red quantum dot film of the red filter layer to emit a mixed light of blue and red, which filtered by the red filter film to emit red light; the blue backlight passing the green quantum dot film of the green filter layer to emit a mixed light of blue and green, which filtered by the green filter film to emit green light; the blue backlight passing the green quantum dot film of the cyan filter layer to emit a mixed light of blue and green to display cyan light; and the blue backlight passing the blue filter layer to emit blue light; so as to realize a four-color scheme based on red, green cyan and blue.

The lower substrate comprises a second bottom substrate, a thin film transistor (TFT) layer disposed on the side of the second bottom substrate closer to the liquid crystal layer, a pixel electrode layer disposed on the TFT layer, and a second alignment film disposed on the pixel electrode layer.

The black matrix has a thickness of 1-3 um.

The red quantum dot film emits a red light with a 620-640 nm peak and a half wave width of 30-40 nm when excited by light; the green quantum dot film emits a green light with a 520-540 nm peak and a half wave width of 30-40 nm when excited by light; the transmittance of the red filter film is above 95.8% for light having wavelength within 620-780 nm, and below 0.2% for light having wavelength within 430-570 nm; the transmittance of the green filter film is above 90% for light having wavelength within 486-560 nm, and below 50% for light having wavelength within 640-730 nm.

The present invention also provides an LCD apparatus, which comprises an LCD panel, and a backlight module disposed below the LCD panel; the LCD panel comprising an upper substrate and a lower substrate, disposed correspondingly with each other; a liquid crystal layer, disposed between the upper substrate and the lower substrate; an upper polarizer, disposed above the upper substrate; and a lower polarizer, disposed below the lower substrate; the upper substrate comprising a first bottom substrate, a black matrix and a color film layer, disposed on the side of the first bottom substrate closer to the liquid crystal layer, a common electrode layer, disposed on the black matrix and the color film layer, and a first alignment film, disposed on the common electrode layer; wherein the black matrix forming a plurality of red sub-pixel areas, a plurality of green sub-pixel areas, a plurality of cyan sub-pixel areas, and a plurality of blue sub-pixel areas on the bottom substrate, the color film layer comprising a plurality of red, green, cyan, and blue filter layer corresponding to the plurality of red, green, cyan, and blue sub-pixel areas; the red filter layer comprising the red filter film and a red quantum dot film on the red filter film; the green filter layer comprising the green filter film and a green quantum dot film on the green filter film; the cyan filter layer comprising a green quantum dot film; and the blue filter layer comprising no material or a transparent film; the backlight module emitting blue light; the red quantum dot film emitting red light under excitation of blue light, and the green quantum dot film emitting green light under excitation of blue light; when the LCD apparatus displaying colors, the blue backlight passing the red quantum dot film of the red filter layer to emit a mixed light of blue and red, which filtered by the red filter film to emit red light; the blue backlight passing the green quantum dot film of the green filter layer to emit a mixed light of blue and green, which filtered by the green filter film to emit green light; the blue backlight passing the green quantum dot film of the cyan filter layer to emit a mixed light of blue and green to display cyan light; and the blue backlight passing the blue filter layer to emit blue light; so as to realize a four-color scheme based on red, green cyan and blue; the lower substrate comprises a second bottom substrate, a thin film transistor (TFT) layer disposed on the side of the second bottom substrate closer to the liquid crystal layer, a pixel electrode layer disposed on the TFT layer, and a second alignment film disposed on the pixel electrode layer; the black matrix has a thickness of 1-3 um; the red quantum dot film emits a red light with a 620-640 nm peak and a half wave width of 30-40 nm when excited by light; the green quantum dot film emits a green light with a 520-540 nm peak and a half wave width of 30-40 nm when excited by light; the transmittance of the red filter film is above 95.8% for light having wavelength within 620-780 nm, and below 0.2% for light having wavelength within 430-570 nm; the transmittance of the green filter film is above 90% for light having wavelength within 486-560 nm, and below 50% for light having wavelength within 640-730 nm.

Compared to the known techniques, the present invention provides the following advantages: the present invention provides a manufacturing method for color film substrate and an LCD apparatus. The method utilizes the quantum dot material to form a color film layer having a red, green, cyan and blue filter layer on the bottom substrate to realize four-color display scheme, improve quantum dot utilization and improve display color domain; the LCD apparatus comprises a color film layer and a blue backlight module, the color film layer comprises red, green, cyan and blue filter layer, the red filter layer comprises a red filter film and a red quantum dot film on the red filter film; the green filter layer comprises a green filter film and a green quantum dot film on the green filter film; the cyan filter layer comprises a green; by using quantum dot material to mix blue backlight and color film layer to realize four-color scheme, improve quantum dot utilization and improve display color domain.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
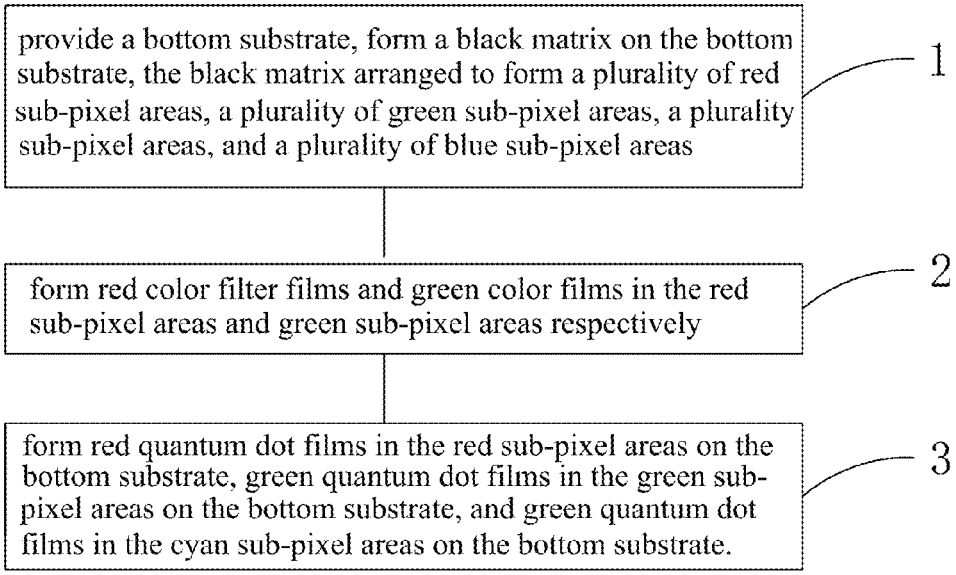
FIG. 1 is a schematic view showing the flowchart of the manufacturing method for color film substrate provided by an embodiment of the present invention.
Figure 2:
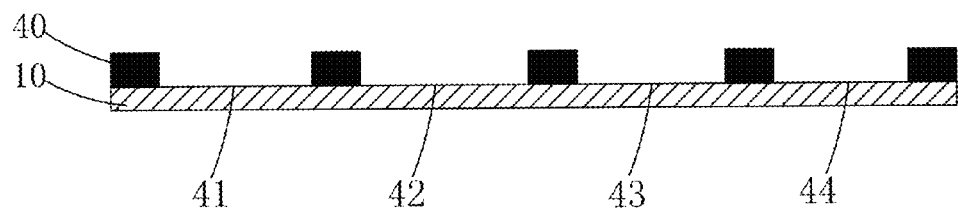
FIG. 2 is a schematic view showing step 1 of the manufacturing method for color film substrate provided by an embodiment of the present invention.

Refer to FIGS. 1-6. The present invention provides a manufacturing method for color film substrate, which comprises:

Step 1: as shown in FIG. 2, providing a bottom substrate 10, forming a black matrix 40 on the bottom substrate 10, the black matrix 40 arranged to form a plurality of red sub-pixel areas 41, a plurality of green sub-pixel areas 42, a plurality of cyan sub-pixel areas 43, and a plurality of blue sub-pixel areas 44 on the bottom substrate 10;

Specifically, the black matrix formed on the bottom substrate has a thickness of 1-3 um. The black matrix 40 is for shielding the light, preventing color mixing between sub-pixels, and acting as stop wall for subsequent steps to form red and green filter film, and red and green quantum dot film by sputter printing.

Figure 3:
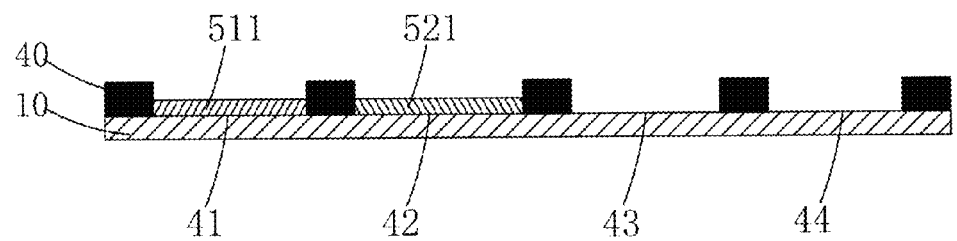
FIG. 3 is a schematic view showing step 2 of the manufacturing method for color film substrate provided by an embodiment of the present invention.

Step 2: as shown in FIG. 3, forming red color filter films 511 and green color films 521 in the red sub-pixel areas 41 and green sub-pixel areas 42 on the bottom substrate 10, respectively;

Specifically, the red filter film 521 can be a red light shielding layer, and the green filter film 521 can be a green light shielding layer.

Figure 4:
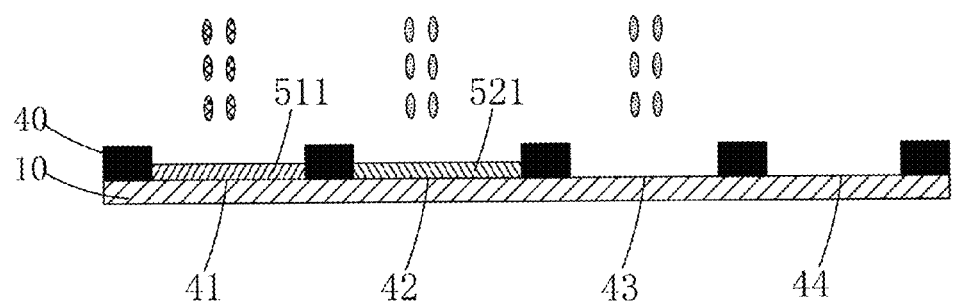
FIGS. 4-5 are schematic views showing step 3 of the manufacturing method for color film substrate provided by an embodiment of the present invention.
Figure 5:
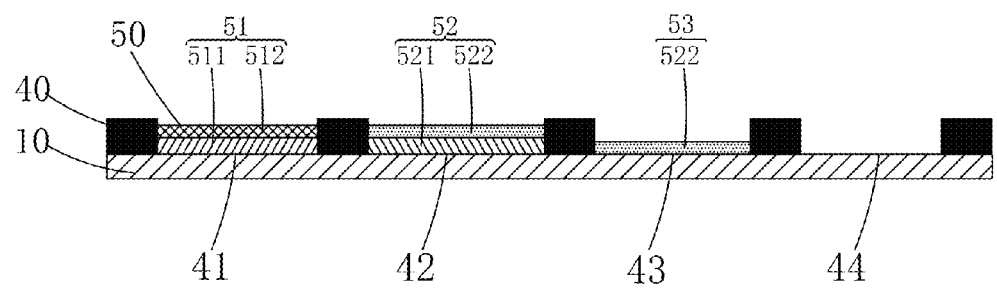

Step 3: as shown in FIGS. 4-5, forming red quantum dot films 512 in the red sub-pixel areas 41 on the bottom substrate 10, green quantum dot films 522 in the green sub-pixel areas 42 on the bottom substrate 10, and green quantum dot films 522 in the cyan sub-pixel areas 43 on the bottom substrate 10;

Specifically, the red quantum dot films 512 and the green quantum dot film 522 are formed by a lithography process, sputter printing process or other processes.

After Steps 2-3, a color film layer 50 is obtained on the bottom substrate 10, the color film layer 50 comprises a plurality of red, green, cyan, and blue filter layers 51, 52, 53, 54 corresponding to the plurality of red, green, cyan, and blue sub-pixel areas 41, 42, 43, 44;

The red filter layer 51 comprises the red filter film 511 and the red quantum dot film 512 on the red filter film 511; the green filter layer 52 comprises the green filter film 521 and the green quantum dot film 522 on the green filter film 521; the cyan filter layer 53 comprises the green quantum dot film 522.

Specifically, the blue filter layer 54 can comprise no material or comprise a transparent film.

When the blue filter layer 54 comprises a transparent film, in Step 2 or Step 3, a transparent film is formed by coating process in the blue sub-pixel areas on the bottom substrate 10.

Figure 6:
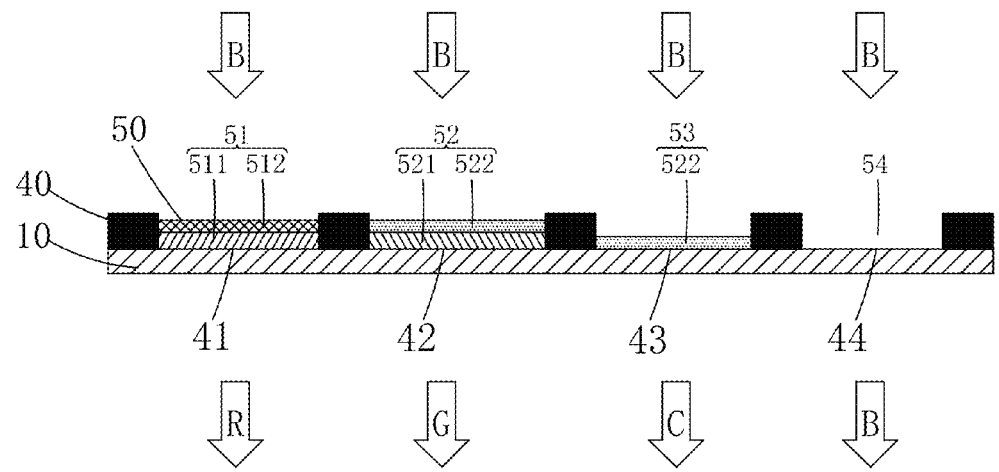
FIG. 6 is a schematic view showing color display theory behind the color film substrate manufactured by the manufacturing method for color film substrate provided by an embodiment of the present invention.

Refer to FIG. 6. The color display theory behind the color film substrate obtained by the manufacturing method of the present invention is as follows. The red quantum dot film 512 emits red light when excited by blue light, and the green quantum dot film 522 emits green light when excited by blue light. The blue backlight passes the red quantum dot film 512 of the red filter layer 51 to emit a mixed light of blue and red, which filtered by the red filter film 511 to emit red light to display red; the blue backlight passes the green quantum dot film 522 of the green filter layer 52 to emit a mixed light of blue and green, which filtered by the green filter film 521 to emit green light to display green; the blue backlight passes the green quantum dot film 522 of the cyan filter layer 53 to emit a mixed light of blue and green to display cyan; and the blue backlight passes the blue filter layer 54 to emit blue light to display blue; so as to realize a four-color scheme based on red, green cyan and blue, as well as improve quantum dot utilization and display color domain.

Figure 8:
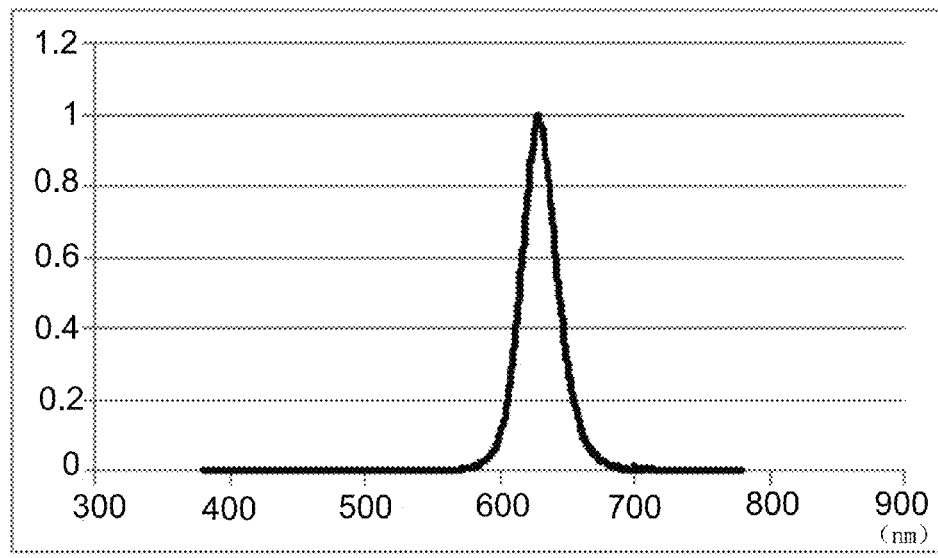
FIG. 8 is a schematic view showing the emission spectrum of the red quantum dot film after blue light excitation in the LCD apparatus and the manufacturing method for color film substrate provided by an embodiment of the present invention.
Figure 9:
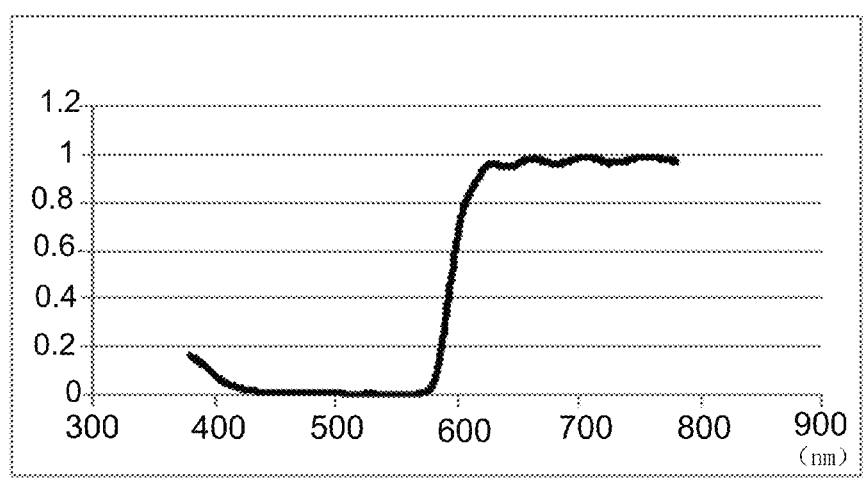
FIG. 9 is a schematic view showing the transmittance of the red filter film with respect to the visible light in the LCD apparatus and the manufacturing method for color film substrate provided by an embodiment of the present invention.
Figure 10:
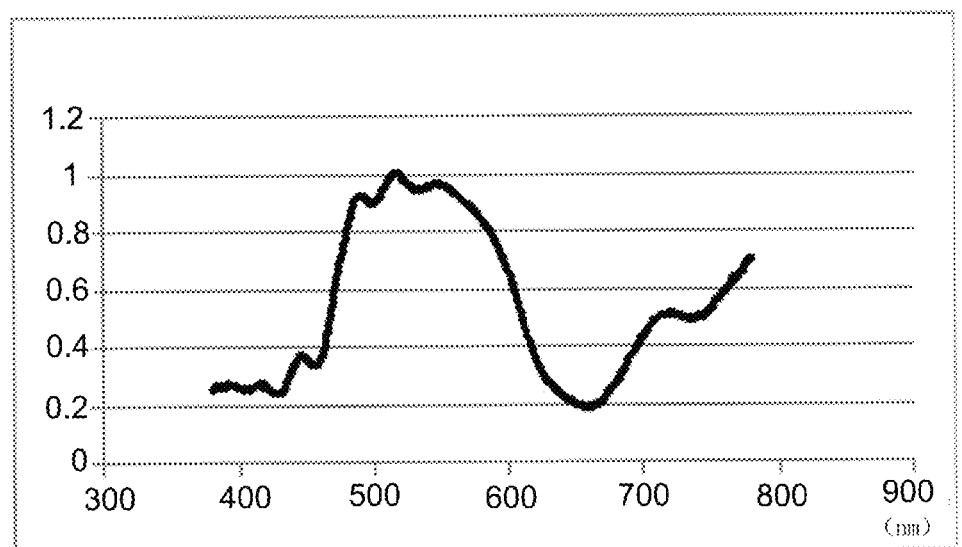
FIG. 10 is a schematic view showing the transmittance of the green filter film with respect to the visible light in the LCD apparatus and the manufacturing method for color film substrate provided by an embodiment of the present invention.

Specifically, to effectively realize the four-color scheme of the display apparatus using the color film substrate obtained by the manufacturing method of the present invention, the following conditions must be met: as shown in FIG. 8, the red quantum dot film 521 emits a red light with a 620-640 nm peak and a half wave width of 30-40 nm when excited by light; the green quantum dot film 522 emits a green light with a 520-540 nm peak and a half wave width of 30-40 nm when excited by light; as shown in FIG. 9, the transmittance of the red filter film 511 is above 95.8% for light having wavelength within 620-780 nm, and below 0.2% for light having wavelength within 430-570 nm; as shown in FIG. 10, the transmittance of the green filter film 512 is above 90% for light having wavelength within 486-560 nm, and below 50% for light having wavelength within 640-730 nm.

Figure 7:
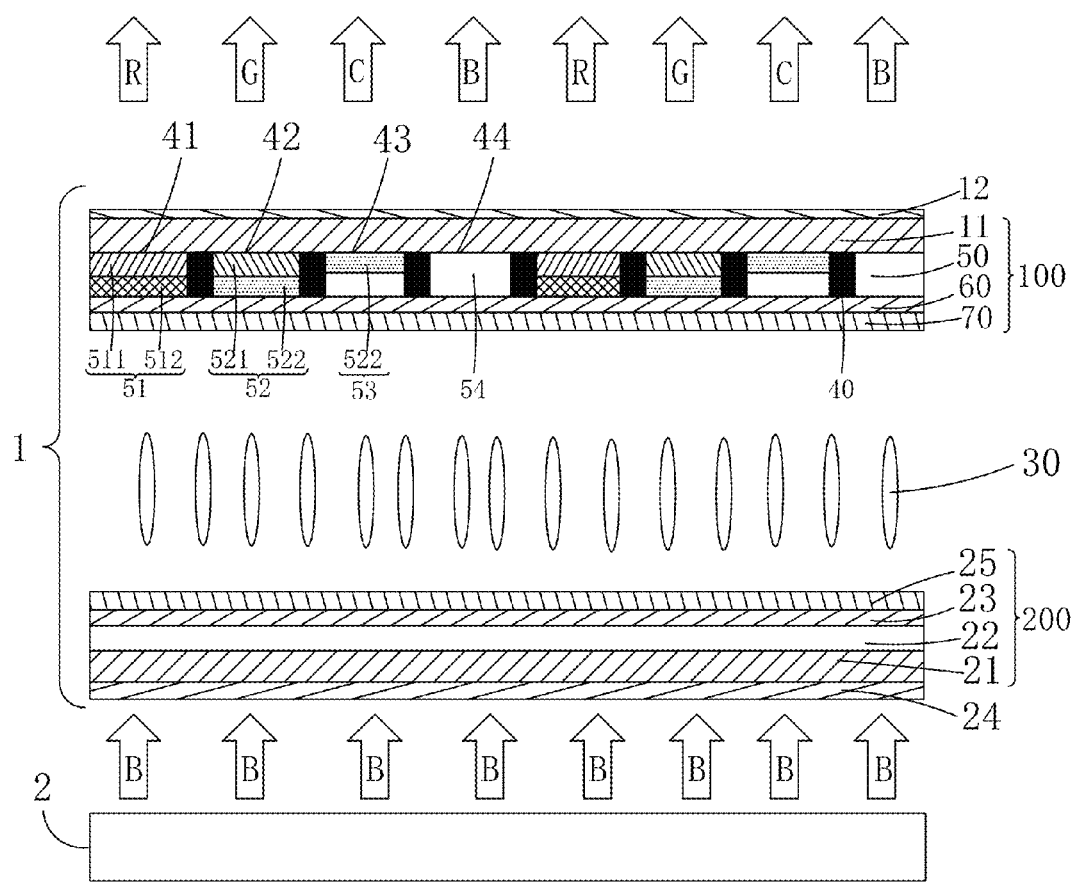
FIG. 7 is a schematic view showing cross-sectional structure of an LCD apparatus provided by an embodiment of the present invention.

As shown in FIG. 7, the present invention also provides an LCD apparatus, which comprises: an LCD panel 1, and a backlight module 2 disposed below the LCD panel 1;

the LCD panel comprising an upper substrate 100 and a lower substrate 200, disposed correspondingly with each other; a liquid crystal layer 30, disposed between the upper substrate 100 and the lower substrate 200; an upper polarizer 12, disposed above the upper substrate 100; and a lower polarizer 24, disposed below the lower substrate 200;

the upper substrate 100 comprising a first bottom substrate 11, a black matrix 40 and a color film layer 50, disposed on the side of the first bottom substrate 11 closer to the liquid crystal layer 30, a common electrode layer 60, disposed on the black matrix 40 and the color film layer 50, and a first alignment film 70, disposed on the common electrode layer 60.

Wherein the black matrix 40 forms a plurality of red sub-pixel areas 41, a plurality of green sub-pixel areas 42, a plurality of cyan sub-pixel areas 43, and a plurality of blue sub-pixel areas 44 on the bottom substrate 11, the color film layer 50 comprises a plurality of red, green, cyan, and blue filter layer 51, 52, 53, 54 corresponding to the plurality of red, green, cyan, and blue sub-pixel areas 41, 42, 43, 44.

The red filter layer 51 comprises the red filter film 511 and a red quantum dot film 512 on the red filter film 511; the green filter layer 52 comprises the green filter film 521 and a green quantum dot film 522 on the green filter film 521; the cyan filter layer 53 comprises a green quantum dot film 522; and the blue filter layer 54 comprises no material or a transparent film.

The backlight module 2 emits blue light.

The red quantum dot film 512 emits red light under excitation of blue light, and the green quantum dot film 522 emits green light under excitation of blue light.

When the LCD apparatus displays colors, the blue backlight passes the red quantum dot film 512 of the red filter layer 51 to emit a mixed light of blue and red, which is filtered by the red filter film 511 to emit red light to display red; the blue backlight passes the green quantum dot film 522 of the green filter layer 52 to emit a mixed light of blue and green, which is filtered by the green filter film 521 to emit green light to display green; the blue backlight passes the green quantum dot film 522 of the cyan filter layer 53 to emit a mixed light of blue and green to display cyan; and the blue backlight passes the blue filter layer 54 to emit blue light; so as to realize a four-color scheme based on red, green cyan and blue.

Specifically, the lower substrate 200 comprises a second bottom substrate 21, a thin film transistor (TFT) layer 22 disposed on the side of the second bottom substrate 21 closer to the liquid crystal layer 30, a pixel electrode layer 23 disposed on the TFT layer 22, and a second alignment film 25 disposed on the pixel electrode layer 23.

Specifically, the LCD apparatus 1 may also have a color filter on array (COA) structure, wherein the color film substrate 50 is disposed at the side under the lower substrate 200. Specifically, the color film substrate 50 can be disposed between the TFT layer 22 and the pixel electrode layer 23.

Specifically, the black matrix 40 has a thickness of 1-3 um.

Specifically, to effectively realize the four-color scheme of the display apparatus using the color film substrate obtained by the manufacturing method of the present invention, as shown in FIG. 8, the red quantum dot film 521 emits a red light with a 620-640 nm peak and a half wave width of 30-40 nm when excited by light; the green quantum dot film 522 emits a green light with a 520-540 nm peak and a half wave width of 30-40 nm when excited by light; as shown in FIG. 9, the transmittance of the red filter film 511 is above 95.8% for light having wavelength within 620-780 nm, and below 0.2% for light having wavelength within 430-570 nm; as shown in FIG. 10, the transmittance of the green filter film 512 is above 90% for light having wavelength within 486-560 nm, and below 50% for light having wavelength within 640-730 nm.

Figure 11:
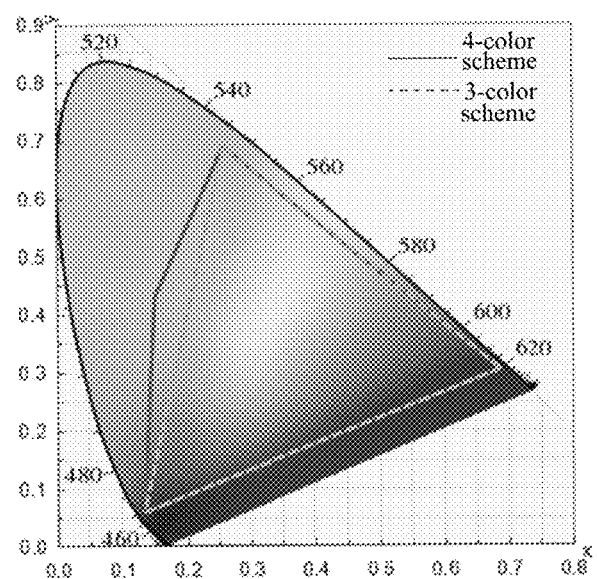
FIG. 11 is a schematic view showing the display color domain comparison for a known display apparatus of three-color scheme and the LCD apparatus of four-color scheme provided by an embodiment of the present invention.

The following Table 1 shows the coordinates and the color domain of each basic color in a three-color scheme and a four-color scheme, and the color domain comparison is shown in FIG. 11.

TABLE 1

|  | Four-color scheme | | | | Three-color scheme | | |
| --- | --- | --- | --- | --- | --- | --- | --- |
|  | R | G | C | B | R | G | B |
| x | 0.687 | 0.258 | 0.151 | 0.134 | 0.687 | 0.258 | 0.134 |
| y | 0.304 | 0.689 | 0.430 | 0.059 | 0.304 | 0.689 | 0.059 |
| NTSC |  | 111.80% | | |  | 100.65% | |

The LCD apparatus of the present invention utilizes the quantum dot material to combine the blue backlight and the color film layer to form a four-color scheme based on red, green, cyan and blue. Compared to conventional RGB-based three-color scheme, the present invention improves the quantum dot utilization and effectively improves the color domain of the display.

In summary, the present invention provides a manufacturing method for color film substrate and an LCD apparatus. The method utilizes the quantum dot material to form a color film layer having a red, green, cyan and blue filter layer on the bottom substrate to realize four-color display scheme, improve quantum dot utilization and improve display color domain; the LCD apparatus comprises a color film layer and a blue backlight module, the color film layer comprises red, green, cyan and blue filter layer, the red filter layer comprises a red filter film and a red quantum dot film on the red filter film; the green filter layer comprises a green filter film and a green quantum dot film on the green filter film; the cyan filter layer comprises a green; by using quantum dot material to mix blue backlight and color film layer to realize four-color scheme, improve quantum dot utilization and improve display color domain.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A manufacturing method for color film substrate, which comprises:
   Step 1: providing a bottom substrate, forming a black matrix on the bottom substrate, the black matrix arranged to form a plurality of red sub-pixel areas, a plurality of green sub-pixel areas, a plurality of cyan sub-pixel areas, and a plurality of blue sub-pixel areas;
   Step 2: forming red color filter films and green color films in the red sub-pixel areas and green sub-pixel areas respectively;
   Step 3: forming red quantum dot films in the red sub-pixel areas on the bottom substrate, green quantum dot films in the green sub-pixel areas on the bottom substrate, and green quantum dot films in the cyan sub-pixel areas on the bottom substrate;
   wherein after Steps 2-3, a color film layer being obtained on the bottom substrate, the color film layer comprising a plurality of red, green, cyan, and blue filter layers corresponding to the plurality of red, green, cyan, and blue sub-pixel areas; and
   the red filter layer comprising the red filter film and the red quantum dot film on the red filter film; the green filter layer comprising the green filter film and the green quantum dot film on the green filter film; the cyan filter layer comprising the green quantum dot film; and the blue filter layer comprising no material or a transparent film.

2. The manufacturing method for color film substrate as claimed in claim 1, wherein in Step 1, the black matrix formed on the bottom substrate has a thickness of 1-3 um.

3. The manufacturing method for color film substrate as claimed in claim 1, wherein in Step 2, the red filter films and green filter films are formed by a lithography or sputter printing process; and in Step 3, the red quantum dot film and the green quantum dot film are formed by a lithography or sputter printing process.

4. The manufacturing method for color film substrate as claimed in claim 1, wherein in Step 2 or Step 3, transparent layers are formed in the blue sub-pixel areas on the bottom substrate; the blue filter layer comprises the transparent layers in the blue sub-pixel areas.

5. The manufacturing method for color film substrate as claimed in claim 1, wherein the red quantum dot film emits a red light with a 620-640 nm peak and a half wave width of 30-40 nm when excited by light; the green quantum dot film emits a green light with a 520-540 nm peak and a half wave width of 30-40 nm when excited by light; the transmittance of the red filter film is above 95.8% for light having wavelength within 620-780 nm, and below 0.2% for light having wavelength within 430-570 nm; the transmittance of the green filter film is above 90% for light having wavelength within 486-560 nm, and below 50% for light having wavelength within 640-730 nm.

* * * * *